US006834610B2

(12) United States Patent
Beaham, III

(10) Patent No.: US 6,834,610 B2

(45) Date of Patent: Dec. 28, 2004

(54) REMINDER DEVICE

(76) Inventor: Gordon T. Beaham, III, 5767 Windsor Cir., Fairway, KS (US) 66205-3340

(*) Notice: Subject to any disclaimer, the term of this patent is extended or adjusted under 35 U.S.C. 154(b) by 19 days.

(21) Appl. No.: 10/155,045

(22) Filed: May 24, 2002

(65) Prior Publication Data

US 2003/0217686 A1 Nov. 27, 2003

(51) Int. Cl.[7] .......... G01D 13/00

(52) U.S. Cl. .......... 116/200; 446/418

(58) Field of Search .......... 116/200, 201, 116/1, 22 R, 22 A, 306, DIG. 44; 446/418, 419, 421; 24/3.6; D3/207; 206/38.1; 383/43

(56) References Cited

U.S. PATENT DOCUMENTS

| | | | | | |
|---|---|---|---|---|---|
| 876,948 | A | | 1/1908 | Dexter | |
| 1,025,007 | A | | 4/1912 | Mieden | |
| 1,206,949 | A | * | 12/1916 | Vaughan | 70/457 |
| 2,125,354 | A | * | 8/1938 | Meier | 383/43 |
| 2,572,703 | A | | 10/1951 | Dennis | |
| 3,111,152 | A | * | 11/1963 | Goessling | 206/38.1 |
| D203,737 | S | * | 2/1966 | Friedman | D99/34 |
| 3,286,751 | A | * | 11/1966 | Dishart | 206/0.81 |
| 4,179,833 | A | | 12/1979 | Knodel | |
| 4,765,459 | A | * | 8/1988 | Edwards | 206/38.1 |
| 5,060,794 | A | | 10/1991 | Linn et al. | |
| 5,181,605 | A | * | 1/1993 | Bishop et al. | 206/37.1 |
| 5,183,153 | A | * | 2/1993 | Linn | 206/232 |
| 5,265,514 | A | * | 11/1993 | Schertz | 84/422.4 |
| 5,467,871 | A | | 11/1995 | DeField | |
| D379,830 | S | * | 6/1997 | Wasylyk | D19/90 |
| D380,084 | S | * | 6/1997 | Kebrian | D3/207 |
| 6,089,060 | A | * | 7/2000 | Steeley | 70/456 R |
| 6,186,552 | B1 | | 2/2001 | Seabrook | |
| 6,219,949 | B1 | | 4/2001 | Pang | |
| 6,334,239 | B1 | * | 1/2002 | Kraut | 24/3.6 |
| 6,464,558 | B1 | * | 10/2002 | Ayres | 446/419 |

* cited by examiner

*Primary Examiner*—Diego Gutierrez
*Assistant Examiner*—Tania Courson
(74) *Attorney, Agent, or Firm*—J. David Wharton; Stinson Morrison Hecker LLP

(57) ABSTRACT

The present invention is a device for use by individuals as a task reminder. The device includes an audible sound producing rattle and one or more message boards coupled with the rattle and adapted to carry a message for the user. Whenever the user walks or otherwise moves, an audible reminder sound will be omitted but when the user is not moving no sound is heard. Once the tasks for the day have been accomplished, the message boards may be erased and reused at another time.

5 Claims, 1 Drawing Sheet

REMINDER DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates generally to reminder devices and, more particularly to a reminder device which is non-electronic in nature but provides an audible sound in response to movement of the user.

As the pace of life has quickened, for better or for worse, adults of all ages have a great many tasks to remember during any given 24 hour period. While there are many high tech electronic devices available as daily reminders which are portable and can be carried in a purse or pocket, these devices are relatively expensive and in some cases not always user friendly. Particularly for older adults, there is a resistance to utilizing electronic equipment of this nature and in some cases inability to master the skills required.

Another disadvantage with electronic reminders is that they are not designed to emit a continuous sound but even if they were, such would be objectionable. While electronic devices can be set to emit an alarm at certain times, this can also be offensive and is useful only if a particular task can be performed at the preset time.

Electronic devices are also dependent upon the life of the operating battery and when the user is travelling it is not always convenient to replace the battery.

The present invention overcomes the deficiencies of the prior art by providing a non-electronic mechanical reminder which emits an audible sound in response to any movement of the user.

It is therefore a primary object of the present invention to provide a reminder device for adults which emits an audible sound to remind the user of one or more tasks to be performed.

As a corollary to the above object, it is the aim of this invention to provide a device which emits an audible sound whenever the user moves but is non-offensive and non-distracting.

As another corollary to the object second above, it is an aim of the invention to provide a reminder device wherein the audible sound emitted ceases when the user is standing still or seated so as not to be disruptive. Another object of the invention is to provide a reminder device wherein daily reminders can be written on message boards and the number of boards can be expanded as needed.

As a corollary to the above object, an aim of the invention is to provide a message board which is erasable and can therefore be reused any number of times.

As a further corollary to the object second above, it is an objective of the invention to provide a reminder device wherein the message boards can be erased easily and immediately without the need for special equipment.

Figure 1:
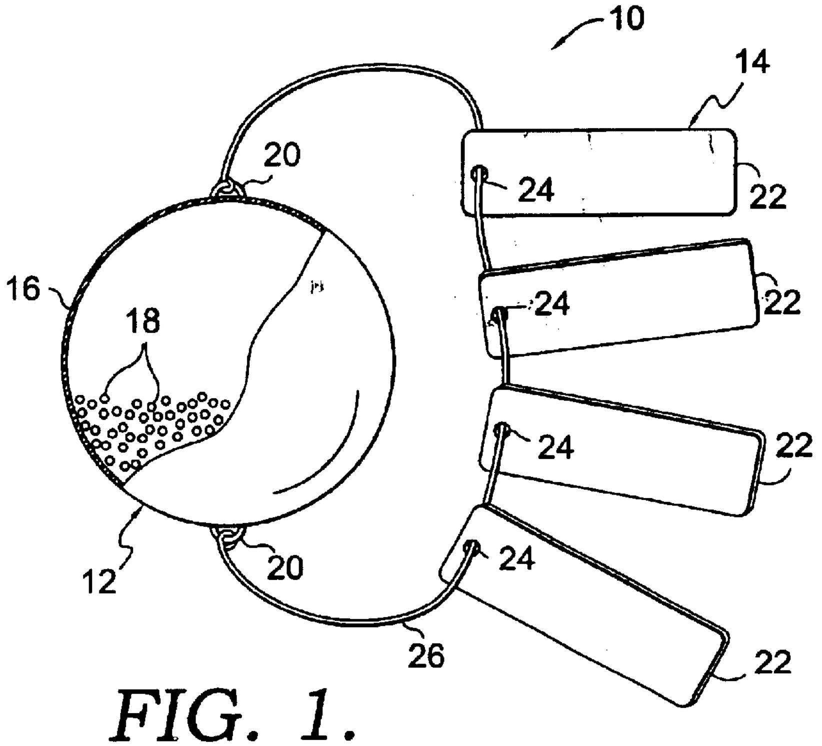
Figure 2:
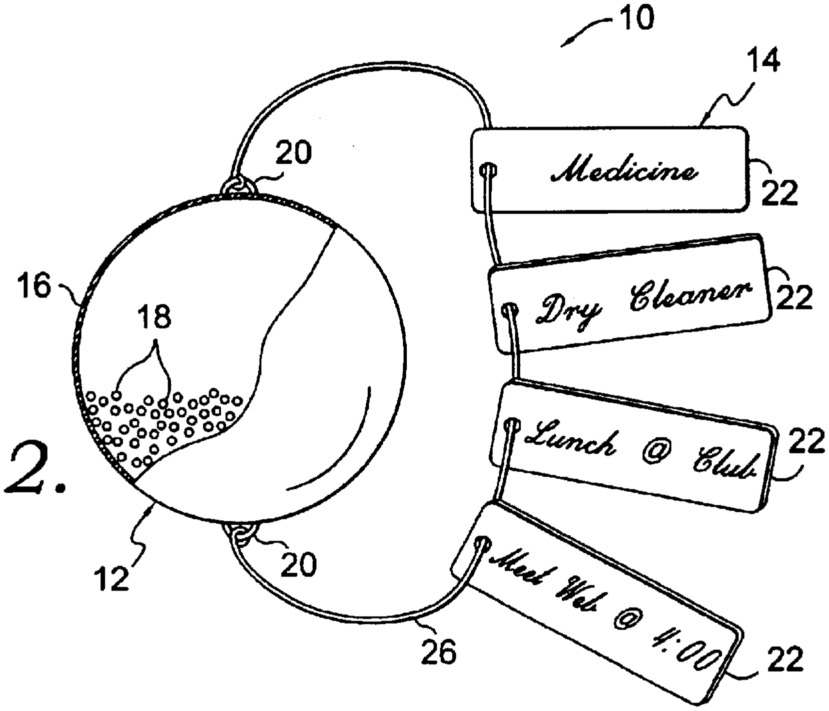

Other objects of the invention will be made clear or become apparent from the following description and claims when read in light of the accompanying drawing wherein:

FIG. 1 is a perspective view, with portions broken away and shown in cross section, of the reminder device according to the present invention with all of the message boards blank; and FIG. 2 is another perspective view, identical to FIG. 1, except that a message has been written on each of the message boards.

Referred initially to FIG. 1, the reminder device of the present invention is designated generally by the number 10 and includes an audible portion 12 and a message portion 14. Audible portion 12 includes a sphere 16 which is partially filled with the plurality of solid particles 18. Two U-shaped appendages 20 are secured to either end of sphere 16.

Message portion 14 comprises a plurality of erasable message boards 22 each of which has a small opening 24 at one end which receives a tether 26, the ends of which are secured to appendages 20 of sphere 16. While tether 26 is shown as a continuous string it is to be understood that it could take the form of a chain or other fastening device and is intended to be removable at either one end of the sphere or along its length to permit addition of and removal of message boards 22. It is to be understood that message boards 22 are preferably of the type that are known to those skilled in the art as “dry erasable boards” which can be marked with a marker and wiped off with a dry cloth.

In use, one or more message boards 22 are secured to tether 26 and tasks to be performed throughout the day are written on the boards. The user then places device 10 in his or her pocket. It is to be understood that the term “pocket” is intended to encompass a pants pocket, a shirt pocket, a purse, a backpack or any other carrying bag commonly used by individuals. With the device 10 in the user’s pocket, any movement will result in particles 18 “rattling” inside of sphere 16 thus creating a continual but non-offensive audible sound whenever the user moves. The device is designed so that the sound emitted will be no more objectionable than keys or coins loose in the user’s pocket. It will, however, be distinctive in that it will create a “rattling sound” and thus be readily distinguishable from keys or change which may also be in the user’s pocket.

One of the advantages of the invention is that any time the user moves (particularly when walking) the audible sound will be present, but when the user sits down and does not move, there is no sound. This provides a nearly constant reminder yet is non-objectionable because the sound is not emitted when it would be inappropriate to do so.

As the day’s tasks are completed, the user will wipe off the reminder on a particular message board until such time as all of the tasks have been accomplished. When the user returns home, he or she may again mark the message boards for the next day’s tasks.

The device offers many advantages which achieve the objectives heretofore set forth, not the least of which is that by being non-electronic, no batteries are required and the cost of manufacturing is much less than electronic devices. Also, the nature of the device is such that rather than an alarm sounding only at a specific time when it may not be convenient to perform the task, the device offers an audible reminder throughout the day so that the tasks may be accomplished at any time.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed is:

1. A device for carrying in the pocket of a user as a task reminder, said device comprising:

a sphere having a plurality of particles permanently contained within the sphere for making a rattle that is distinguishable from keys when the sphere is moved; and at least two erasable message boards separately coupled with said sphere by a tether, wherein each message board includes an aperture at one end which receives said tether and at least one exposed writing surface adapted to carry a message for the user.

2. A device as set forth in claim 1, wherein said at least two message boards are dry erasable message boards.

3. A device as set forth in claim 1, wherein said tether is a continuous string.

4. A device as set forth in claim 3, wherein said continuous string includes a pair of ends that are removeably secured to said sphere.

5. A device for carrying in the pocket of a user as a task reminder, said device comprising:

a sphere having a plurality of solid particles permanently contained within the sphere for making a noise distinguishable from keys when the sphere is moved;

a continuous string having a pair of ends that are removeably secured to said sphere; and a plurality of dry erasable message boards, each including an aperture at one end which receives said continuous string to separately tether each message board to said sphere and wherein each message board further includes an exposed writing surface adapted to carry a plurality of messages for the user.

* * * * *